Dec. 23, 1958　　　H. J. BICHSEL　　　2,866,147
ARC WELDING APPARATUS
Filed Sept. 4, 1953　　　3 Sheets-Sheet 1
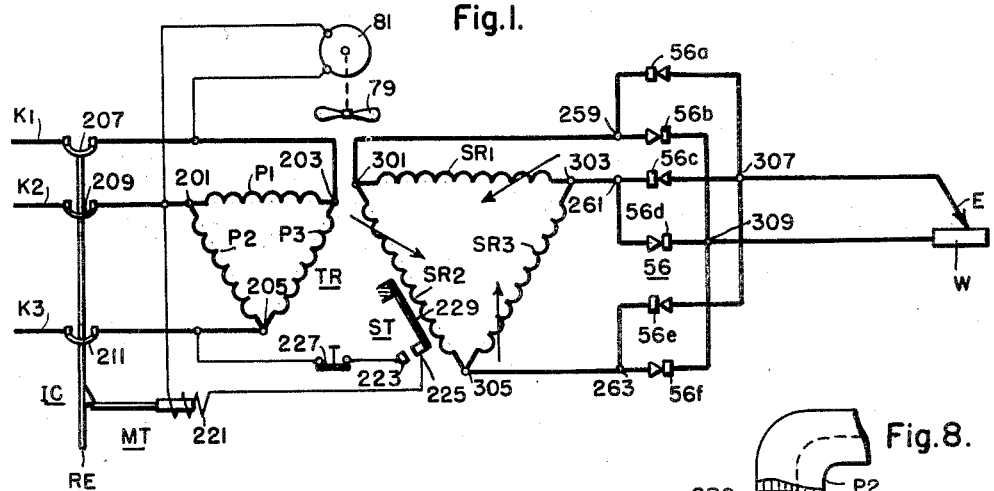
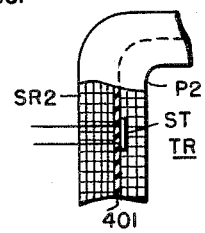
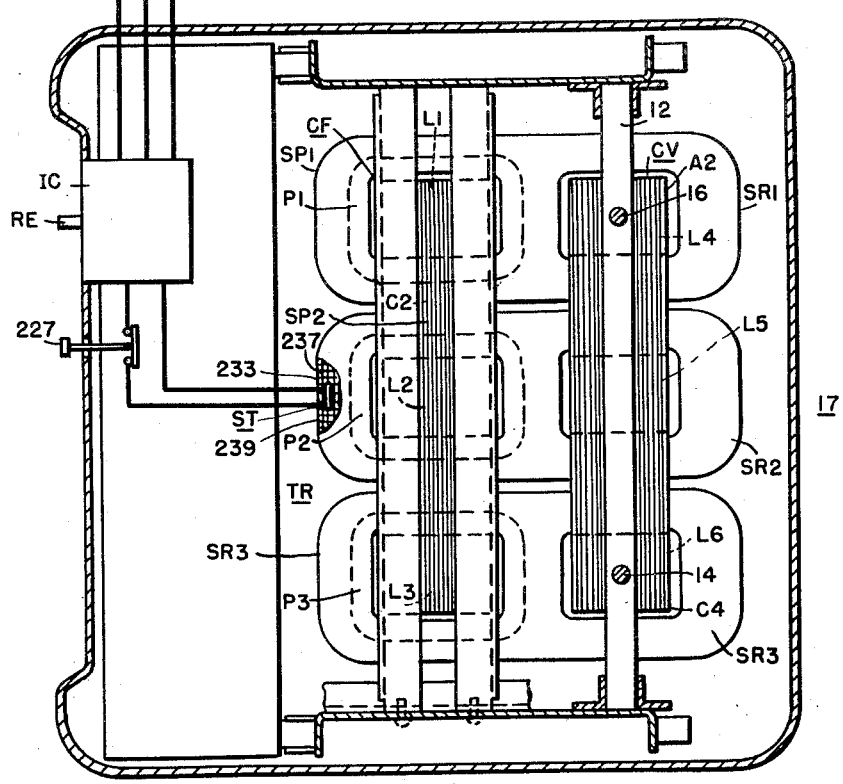

Dec. 23, 1958   H. J. BICHSEL   2,866,147
ARC WELDING APPARATUS
Filed Sept. 4, 1953   3 Sheets-Sheet 2

Dec. 23, 1958     H. J. BICHSEL     2,866,147
ARC WELDING APPARATUS
Filed Sept. 4, 1953     3 Sheets-Sheet 3
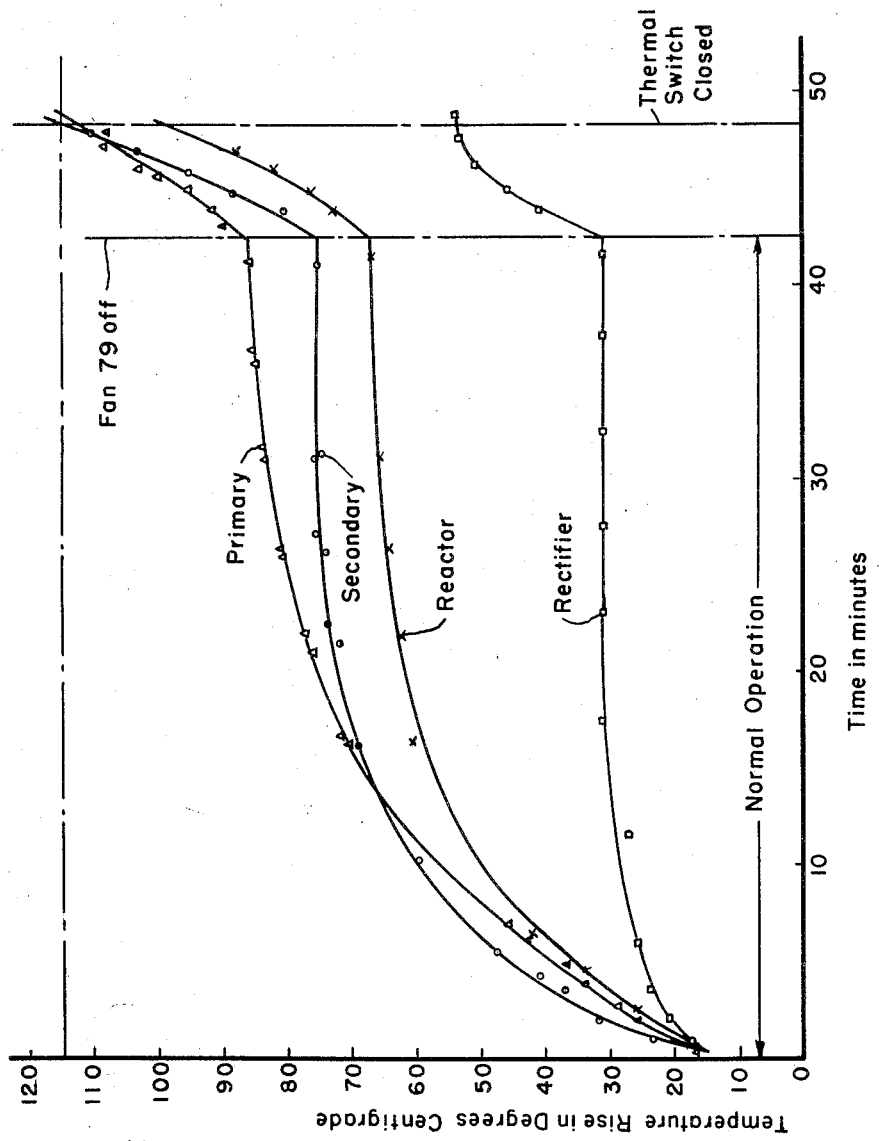
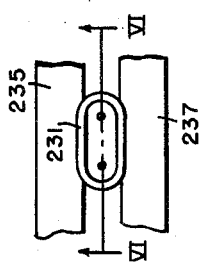
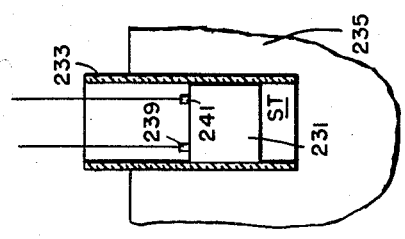

United States Patent Office 2,866,147  
Patented Dec. 23, 1958

2,866,147

ARC WELDING APPARATUS

Harry J. Bichsel, East Aurora, N. Y., assignor to Westinghouse Electric Corporation, East Pittsburgh, Pa., a corporation of Pennsylvania Application September 4, 1953, Serial No. 378,629

10 Claims. (Cl. 321—14)

My invention relates to arc welding apparatus and has particular relation to arc welding apparatus of the direct-current type.

This invention is, in its specific aspects, based on the direct-current arc welder disclosed in application Serial No. 357,321 for Direct-Current Arc Welders, filed May 25, 1953, to Emil J. Steinert, Harry J. Bichsel and Ray Verne Lester, and assigned to Westinghouse Electric Corporation, which I will call hereinafter the Steinert application. To the extent that may be necessary for the understanding of my invention, the Steinert application is included by reference in this application and made a part of it. Further, to the extent that any invention made by me alone is disclosed in the Steinert application, this application is a continuation-in-part of the Steinert application.

The Steinert application discloses an arc welder including a polyphase transformer, the primary of which is connected to a polyphase source and the secondary of which supplies a rectifier. The output terminals of the rectifier are connected between a welding electrode and work in the usual practice of the invention disclosed in the Steinert application. Extensive investigations carried out with this apparatus has revealed that it is essential that protective means against overheating be provided for the apparatus. This protective means should protect not only the transformer but also the rectifier. In direct-current arc welders constructed in accordance with the teachings of the prior art of which I am aware, the protective apparatus includes circuit interrupting means such as a circuit breaker which operates in response to the current flow through the transformer. The actuating mechanism of the breaker is usually connected to conduct current proportional to the current which flows through the primary of the welding transformer and when this current becomes excessive, it operates the circuit breaker.

I have found that this prior art apparatus is not altogether satisfactory. Its principal disadvantage arises from the fact that welding apparatus is usually designed to be operated from power sources of different voltage magnitude. Since the primary draws different current for the different voltages, and the actuating mechanism can be set to respond to overloads corresponding only to one or the other of the currents, the prior art apparatus is inadequate. Thus when welding apparatus is supplied from a 220 volt source and is drawing 300 amperes load current, the primary draws of the order of 58 amperes while, when welding apparatus is supplied from a 440 volt source, the primary draws only 29 amperes for the same load current. Protective apparatus of the prior art type in which the actuating mechanism is set to operate when the apparatus is supplied from 220 volts will fail to operate for an overload when the apparatus is adapted to be supplied from 440 volts. The same conditions arise for the other voltages at which the apparatus may be designed to operate.

It is accordingly an object of my invention to provide arc welding apparatus which shall be effectively and reliably protected against overload conditions independently of the voltage at which it is operating.

Another object of my invention is to provide arc welding apparatus including overload protective facilities of simple and low-cost structure.

A further object of my invention is to provide rectifier apparatus which shall be effectively and reliably protected by a low-cost protective system.

An incidental object of my invention is to provide rectifier apparatus having novel protective facilities.

Industrial welders are rated on a duty cycle basis. Thus a 400 ampere welder is designed to deliver 400 amperes at 40 volts load potential on a 60% duty cycle; that is 6 minutes on and 4 minutes off repeated every 10 minutes. In addition provisions are incldued to enable the operator to set a welder to supply at least 125% of rated current.

In arriving at my invention I have realized that one of the principal purposes of protective apparatus is to protect the welders from overheating which arises from this practice; that is, the protective apparatus is to protect a welder such as is disclosed in the Steinert application against he overheaing of the windings and insulation of the transformer and of the rectifier which occurs during operation at too high a duty cycle, too high a current setting or both. That such overheating may be substantial can be realized by considering the above mentioned 400 ampere welder. A 400 ampere welder operated on a 60% duty cycle basis delivers only 310 amperes continuously. If this welder were operated continuously at 400 amperes the heat developed would be $$\left(\frac{400}{310}\right)^2$$

times the rated heat or about 67% more than rated power. If the same welder were operated at 125% current setting it would draw 500 amperes or develop about 56% more than rated heat.

Another purpose of the protective apparatus is to protect it against overheating when the cooling fan is turned off.

My invention arises from the discovery, as a result of extended investigation and study, that arc welding apparatus as disclosed in the Steinert application and apparatus similar to it may be effectively protected against overheating particularly in the situations just mentioned by a single thermally actuable element disposed to respond to a temperature of a region of the apparatus which develops heat at a rate critically representative of the development of heat in the other important parts of the apparatus. This element may be actuated at a temperature of the critical region which is reached before dangerous temperatures are reached in the other parts of the apparatus. Specifically, I have found that the thermally actuable element should be mounted in intimate contact with a portion of the transformer, either with the primary or with the secondary reactor, but preferably in contact with a portion of the turns of a secondary-reactor winding of the transformer. My investigation has revealed that a thermally actuable element set to open when this region approaches a critical temperature opens at a time when the other portions of the apparatus, such as the rectifier or the other parts of the transformer, are well below any dangerous temperatures.

In conducting the study which has given rise to my invention as just described, I have considered in detail with the aid of elaborate measurements the thermal and electrical properties of the various vulnerable parts of the apparatus. These parts are principally the rectifier, the primary windings and the secondary-reactor windings. The rectifier is usually of the dry type and is an assembly made up of a number of rectifier units or stacks. The mass of the rectifier assembly is relatively low and the rectifier would then tend to heat up at a relatively high rate. However, the rectifier elements of the stacks are provided with fins and the stacks are relatively widely spaced so that the emission of heat from the rectifier by radiation, conduction and convection is relatively high. When the rectifier is subjected to conditions tending to increase its temperature, then, it tends to reach a relatively stable temperature in a short time and the temperature of the rectifier begins to level off soon after it is subjected to the conditions tending to increase the temperature and the danger to temperature for the rectifier is approached gradually slower.

The various components of the transformer are massive. When the transformer is subjected to conditions tending to increase its temperature this temperature rises slowly. But the turns of the windings of the transformer are closely associated and are enclosed in insulation and the heat flow from the transformer by reason of radiation, convection and conduction is not at a high rate. The transformer then has a tendency to rise in temperature at a substantial rate which may in fact increase as the heating continues. My study has further revealed that certain portions of the secondary-reactor winding of the transformer rises at a substantially higher rate than the primary or other portions of the secondary-reactor. In accordance with the specific aspects of my invention then, the thermal element which actuates the circuit interrupting means is for this reason mounted in intimate thermal contact with certain of the turns of the secondary.

A further aspect of my invention arises from the realization that the thermally actuable element once operated tends to cool down relatively slowly so that it prevents reclosing of the circuit interrupting means of the apparatus a short time after it is opened. To facilitate resetting of the apparatus a short time after operation of the circuit interrupting means, the circuit for tripping the interrupting means is provided with a switch which may be actuated to permit operation independently of the thermally actuable means.

The novel features that I consider characteristic of my invention are set forth generally above. The invention itself, both as to its organization and its method of operation, together with additional objects and advantages thereof may be understood from the following description of a specific embodiment when read in connection with the accompanying drawings in which:

Figure 1 is a circuit diagram of an arc welder in accordance with my invention;

Fig. 2 is a view in transverse section with certain parts broken away of an arc welder in accordance with my invention showing the welding transformer and its associated parts;

Fig. 5 is a view in plan of a small portion of the secondary-reactor of the arc welder shown in Fig. 2;

Fig. 6 is a view in section taken along line VI—VI of Fig. 5;

Fig. 7 is a graph presented to aid in explaining my invention; and

Fig. 8 is a fragmentary view showing a modification of my invention.

Fig. 2 is similar to Fig. 2 of the Steinert application, and Fig. 3 is similar to the lower part of Fig. 1 of the Steinert application. So that the relationship between this application and the Steinert application may be understood, the labelling of the drawings of the Steinert application is, to the extent practicable, followed in this application.

Figure 3:
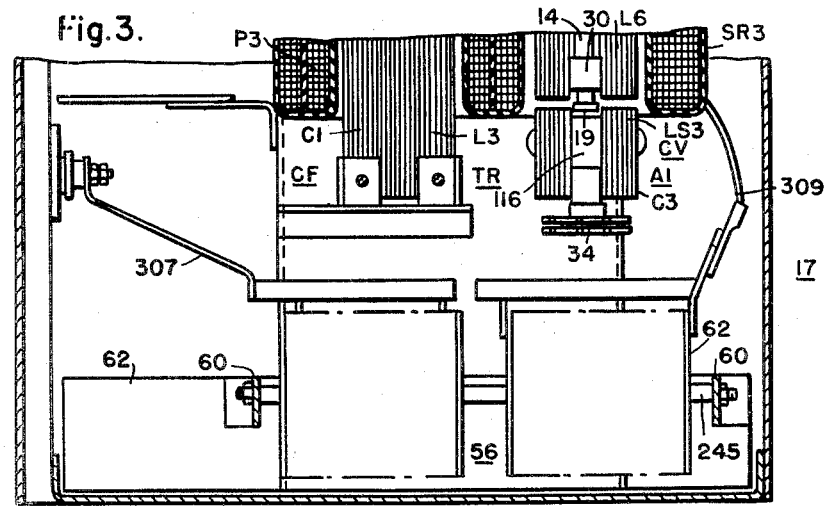
Fig. 3 is a view partly in front elevation and partly in transverse section of the lower portion of the arc welder shown in Fig. 2 with the wall of the cabinet removed.
Figure 4:
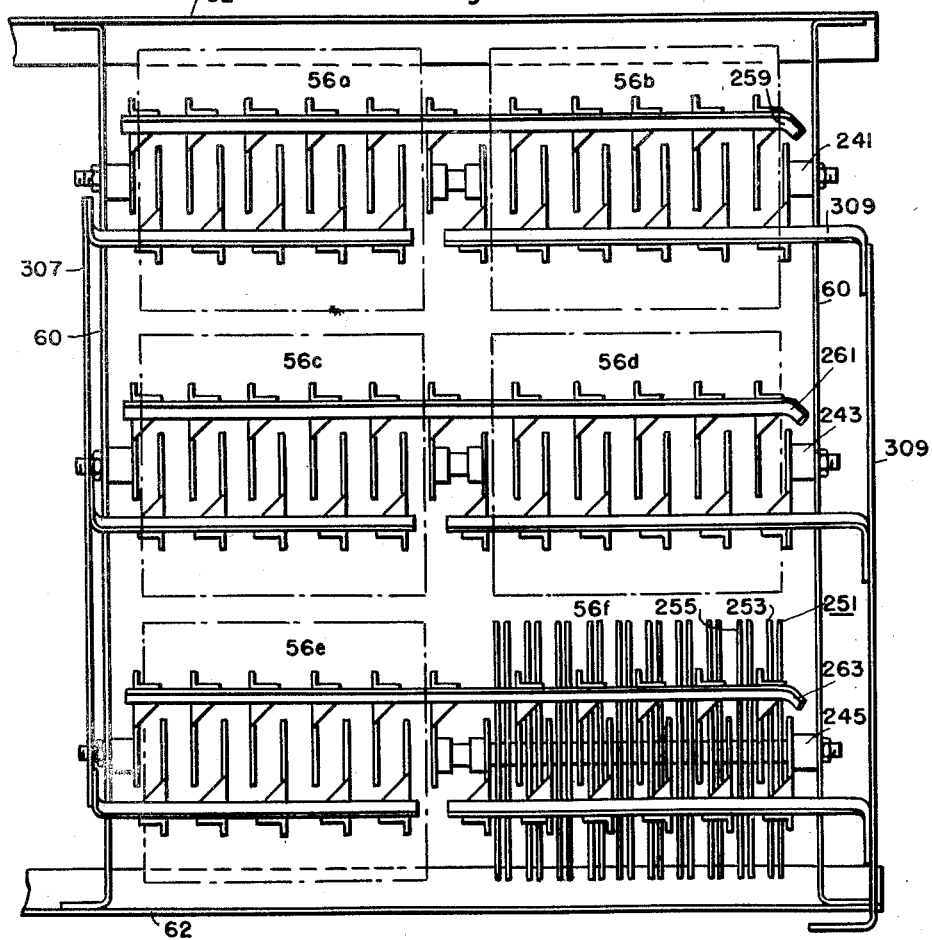
Fig. 4 is a view in plan, enlarged, of the rectifier assembly included in the arc welder shown in Fig. 2 and Fig. 3.

The apparatus shown in the drawings includes a three-phase transformer TR, having primary windings P1, P2 and P3 and secondary-reactor windings SR1, SR2 and SR3. The primary windings P1, P2 and P3, and the secondary-reactor windings SR1, SR2 and SR3, are each connected in delta. The transformer TR has a fixed reluctance core CF and a variable reluctance core CV. The fixed reluctance core has cross laminations C1 and C2 between which legs L1, L2 and L3 extend. The variable reluctance core CV is made up of two equal sections CV1 and CV2, each of which has a lower fixed part or assembly A1 consisting of cross lamination C3 and three stub legs LS1, LS2 and LS3 (only LS3 shown; all three shown in Steinert application), and an upper movable part or assembly A2 consisting of cross lamination C4 and legs L4, L5 and L6. The upper part A2 may be moved by means of cross bar 12 from rods 14 and 16. The rods are rotatable and the upper part A2 may be moved upwardly and downwardly as the rods are rotated so that the spacing between the movable legs L4, L5, L6 and the fixed legs LS1, LS2, LS3 and the reluctance of the core varied.

The primary windings P1, P2, P3 are mounted on the fixed core CF encircling the legs L1, L2, L3, respectively. The secondary reactor windings SR1, SR2 and SR3 include a number of turns wound about sets of legs L1 and L4 and LS1, L2 and L5 and LS2 and L3 and L6 and LS3, respectively, of the fixed and variable cores, the remaining turns being wound only about the legs L4 and LS1, L5 and LS2 and L6 and LS3 of the variable core. While all of the turns of the secondary-reactor cooperate to produce the desirable electrical features of the arc welder thus far disclosed, I will, only for the purpose of distinguishing between the two groups of turns in this discussion, call the turns wound about the legs of the fixed and variable reluctance cores the secondary turns or the secondary and the turns wound about the legs of the variable reluctance core only the reactance turns or the reactor.

The electrical apices 201, 203, 205 of the primary delta network are connected to the buses K1, K2, K3 through the contactors 207, 209, 211, respectively, of a circuit interrupting means IC, such as a circuit breaker. The circuit interrupter IC preferably is of the shunt-trip type known in the art as the AB circuit breaker. Such a breaker has in addition to the components just described a trip mechanism MT, actuable by a trip coil or solenoid 221. The interrupter IC is also provided with a resetting handle RE which extends through the wall of the cabinet 17.

The coil 221 is in accordance with my invention adapted to be connected between the apices 201 and 205 through the normally open contacts 223 and 225 of a thermal switch ST, such as a Thermoguard thermostat, and a normally closed push button 227. The actuating bimetal 229 of the switch ST is in intimate contact with the secondaries of one of the secondary-reactor windings SR2. As shown in Figs. 5 and 6, the thermostat ST is enclosed in an insulating container 231 which is usually composed of a phenolic condensation product. The container is mounted in a tube 233 of glass or like material and the tube is inserted between two turn layers 235 and 237 of the secondary (SR2). The tube 233 extends well over the container 231 and above the layers 235 and 237 to provide a long electrical leakage path between the terminals 239 and 241 of the thermostat ST and the turns. The transformer is dipped in varnish and baked after the thermostat ST is inserted. Care must be taken to prevent the leakage of varnish through the container 231. Such varnish may cause contacts 223 and 225 to stick. Leakage may for example be prevented by spraying a quick drying paint over the surface of the container 231.

The conductors K1, K2 and K3 are supplied from the usual commercial supply which may have various voltages, such as 220, 440, 550 and other higher voltages.

The apparatus disclosed in the drawings also includes a rectifier assembly 56 which includes six units 56a, 56b, 56c, 56d, 56e and 56f. The units 56a through 56f are mounted in pairs 56a and 56b, 56c and 56d, and 56e and 56f on rods 241, 243, 245 which are secured to channels 60. The channels 60 are secured to angle brackets 62 fastened to the base of the container 17. The units 56a through 56f are well spaced so that air may be circulated through them readily for cooling.

Each unit 56a through 56f consists of a stack of dry rectifiers 251 each of rectangular section. The rectifier plates 253 are spaced a substantial distance as shown for unit 56f so as to permit them to cool effectively. The plates themselves serve as fins to conduct the heat from the rectifying bases of the dry rectifier elements.

The rectifier units 56a through 56f are preferably, although not necessarily, of the selenium type. Such units used in the preferred practice of my invention consist of an aluminum plate 253, such as is shown in the drawing, which is nickel plated and on one surface of which a layer of selenium is deposited. Near the center of the plate on the selenium, a layer of cadmium sulphide is deposited and on the cadmium sulphide a layer of cadmium-tin alloy is deposited. The rectification effect is produced between the cadmium tin alloy and the selenium and the terminals of the rectifier are connected to the aluminum and to the cadmium tin alloy.

In the practice of my invention, the rectifier units 56a through 56f are connected in a so-called bridge network. A positive terminal of units 56a, 56c and 56e and a negative terminal of units 56b, 56d and 56f are connected respectively by a common conductor 259, 261 and 263 to an apex 301, 303 and 305 of the delta secondary-reactor circuit. The negative terminals of the units 56a, 56c and 56e are all connected to a common conductor 307 which is connected to the welding electrode E. The positive terminals of the other units 56b, 56d and 56f are connected to a common conductor 309 to the work W.

The transformer TR and the rectifier 56 are, in accordance with the practice of my invention, so designed as to supply an open-circuit voltage of 70 between the electrode E and the work W, and to supply between 8 amperes and 600 amperes in a welding operation.

The apparatus is provided with a fan 79 driven by a motor 81 which is connected across a pair of apices 201 and 203 of the primary circuit. The fan supplies cooling air through the transformer TR and the rectifier 56.

In the operation of the apparatus, the circuit interrupter IC is closed and power is supplied from the buses K1, K2, and K3 to the primary circuit and through it to the secondary-reactor circuit and the rectifier 56 and between the winding electrode E and the work W. The apparatus is set for a welding operation by adjusting the movable assembly A2 of the variable reluctance core so that the secondary reactor units SR1, SR2 and SR3 have the necessary reactance. In producing a weld, the operator brings the electrode E into engagement with the work W for a short time interval and then separates the electrode from the work to produce an arc. The welding operation may then proceed.

The setting of the movable assembly A2 determines the impedance of the secondary-reactor windings SR1, SR2, SR3 and thus determines the magnitude of the welding current. The secondary-reactor windings absorb a portion of the impressed voltage depending on the setting of the assembly A2. Since these windings are connected in a delta network, the energy resulting from the action of the secondary-reactor windings is dissipated in the network and to an extent to the windings. But so long as the welding operation proceeds normally, the thermostat ST, although it is heated, is not sufficiently heated to close its contacts 223 and 225. The circuit interrupter IC then remains in closed position.

Abnormalities in the operation requiring operation of the interrupter IC may occur under various conditions. Among these, the principal conditions are that the blower 79—81 may stop operating or may operate ineffectively, the operator may hold the electrode E in engagement with the work W for an excessive time interval, or the welding may be carried out at a duty cycle higher than that for which the apparatus is rated or at higher than rated current.

The condition which arises from improper operation of the blower 79—81 is illustrated in Fig. 7. This graph shows the actual temperature variations of the various components of the apparatus with the fan on and off as a function of time. The curves which are labelled to correspond to the various components were prepared operating a 300 ampere welder, as disclosed herein, from a cold start at an ambient temperature of 25° C. The welder was operated continuously under short-circuit load conditions drawing approximately 232 amperes. The temperature measuring devices were thermocouples. To measure the rectifier temperature, a number of such thermocouples were distributed on the rectifier assembly. To measure the temperature of the transformer components, the windings of the components were wound with thermocouples inserted between them. Thermocouples were inserted between turns of the primary windings P1, P2, P3; at least one thermocouple was inserted between the turns of the portion of the secondary-reactor winding which is wound about both cores CF and CV (called secondary above); and at least one thermocouple was inserted between the turns of the portion of the secondary-reactor winding which is wound only about the variable reluctance core CV (called reactor).

In Fig. 7, the temperature rise of each component in centigrade degrees is plotted vertically and the time of operation of the apparatus is plotted horizontally. The four curves as labelled are the curves for the rectifier 56, the secondary portion of the secondary-reactor SR1, SR2, SR3, the reactor portion of the secondary-reactor, and the primary P1, P2, P3.

It is seen that starting from cold start with the fan 79 on, the temperature rise of the rectifier levels off at about 31° after a time interval of approximately five minutes. This condition arises because the rectifier 56, while of light weight, includes facilities for increasing the effectiveness of its heat emission. The spacing between the units 56a through 56f is substantial, and the plates 253 are also well spaced. The operation of the fan 79 then quickly draws the heat away from the internal parts of the rectifier where it is generated.

The temperature of the reactor portion of the secondary-reactor, the secondary portion of the secondary reactor, and the primary level off at temperature rises of 67°, 75° and 80° between 40 and 50 minutes after the operation is started with the fan on. These components are of large mass and absorb heat slowly. They rise to a substantial temperature before leveling off because the heat developed in these components is developed in close proximity to the turns and because of the construction of the windings they are not effective emitters of heat developed.

The leveling off temperatures of the rectifier 56, the secondary, and the reactor and the primaries P1, P2, P3 are, according to my findings, substantially lower than the danger temperatures for these components. I have found that the danger temperature for the rectifier 56 is 125° C. (or 100° rise over 25° C. ambient) and the danger temperature for the components of the transformer-reactor TR is 150° C. (or 125° rise over 25° C. ambient). It is seen that during normal operation, the temperature rises of approximately 31° C. for the rectifier 56, 67° C. for the reactor, 75° C. for the secondary and 86° C. for the primary are substantially lower than the danger temperatures; and it is for this reason that the thermostat ST remains open and the circuit breaker remains closed during normal operation.

In Fig. 7, the temperature rises of the various components after the operation of the cooling fan 79 is interrupted, is also shown. It is seen that the rectifier 56 rises in temperature rapidly and at a higher rate than with the fan on, once the fan is turned off. The increased rate of rise occurs because the rectifier by reason of its structure and its mounting near the base of the cabinet 17 is particularly well adapted to be cooled by the fan. Once the fan is turned off, this effective cooling is removed and the rectifier, being of light weight, quickly manifests the influence of the heat which is supplied to it. But the rise in temperature does not continue to a high rate. Because of the open construction of the rectifier 56, it is capable of effectively emitting or giving up its heat even with the fan turned off. It is for this reason that the heating curve for the rectifier begins to level off at approximately 53° temperature rise. The primary, secondary and reactor windings also rise in temperature after the fan is turned off, the secondary rising at a higher rate than the others. The rise in temperature of these components does not level off and appears in fact to increase in rate. This condition arises because the winding components are relatively ineffective emitters of heat. The secondary rises at a higher rate than either the reactor or the primary, because not only is it subject to the heat developed by the current flow through its own windings, but it also absorbs a large proportion of the heat developed in the reactor windings. This condition arises because the secondary-reactor windings SR1, SR2, SR3 are connected in delta and the energy absorbed by the reactor in maintaining the voltage between the electrode and the work circulates through the secondary windings and is to a large extent absorbed in them. Since the secondary rises in temperature at the highest rate, the most effective protection is afforded by controlling the interrupter IC from the secondary, and for this reason the thermostat ST is mounted in intimate thermal contact with a number of the secondary turns of the secondary-reactor winding SR2 and is set to operate when the temperature of these turns rises to a magnitude well below their danger temperature. This temperature is well below the danger temperature for the other components of the apparatus.

If then an overheating condition simulating the turning off of the fan 79 occurs, or the fan 79 is actually turned off, the secondary (SR2) reaches a temperature at which the thermostat ST operates, contacts 223 and 225 engage closing the circuit through the trip coil 221 and permitting the interrupter IC to drop out. The supply to the primaries P1, P2 and P3 is then interrupted, and since the rectifier 56 is at this time well below its danger temperature, it, as well as the transformer-reactor TR is protected by the opening of the interrupter.

The opening of the interrupter IC opens the circuit of motor 81 and turns off the fan. The cooling of the thermostat ST and the opening of the contacts 223 and 225 is then delayed for an appreciable time interval. The push button 227 is provided to permit reclosing of the interrupter IC before the contacts 223 and 225 have opened. To reclose the interrupter, the button 227 is held open holding open the circuit through the trip coil 221, and the handle RE is operated to close the interrupter. The interrupter then remains closed so long as the button 227 is held open, even if the contacts 223 and 225 are still closed. The fan is then turned on and cools the thermostat ST so that the contacts 223 and 225 are opened.

In the apparatus on which Fig. 7 is based, the thermostat ST was set to operate at approximately 115° C. rise. Hence, when the secondary reached this temperature, the thermostat closed, closing the circuit through the trip coil 221 of the circuit interrupter IC and permitting the later to drop out and to interrupt the supply of power to the apparatus. Since the interruption occurred when the secondary turns were at approximately 115° C. rise, it occurred when the primary turns were at 113° C. rise, when the reactor turns are at 97° C. rise, and when the rectifier was at 54° C. rise. The circuit breaker then opened well before any of the components had reached a danger temperature.

Fig. 7 was produced with a short circuited load and presents the manner in which the temperature of the various components vary under such conditions. It appears that for too high a duty cycle or excessive load current with the fan either on or off, the variation would be of the same character as that shown in Fig. 7. Under these circumstances then the secondary turns of the secondary-reactor winding SR2 or of the other secondary-reactor windings SR1 or SR3 would rise at a substantially higher rate than the other components and the operation of the thermostat when these turns reach a predetermined temperature below the danger point for these turns would also afford protection for the other components.

If all or a large portion of any primary winding P1, P2 or P3 were short circuited, the power line fuses (not shown) would operate to disconnect the supply. If all or a large portion of a secondary-reactor winding SR1, SR2 or SR3 were short circuited, high current would be induced in the corresponding primary P1, P2 or P3 and again the fuses would blow.

Thus, I have provided an arc welder in which a thermally actuable element disposed to respond to the temperature of the transformer reactor TR affords complete protection for a direct-current arc welder. The temperature at which the thermally actuable element operates is critically indicative of the temperature of the other components of the apparatus and is reached well before the other temperatures are at a danger point. The thermally actuable element thus operates to protect the apparatus against overheating or overloads.

While I have shown and described a certain specific embodiment of my invention, many modifications thereof are possible. Thus the thermostat ST may be embedded in one of the primaries P2 as shown in Fig. 8 rather than in the secondary reactor SR1, SR2, SR3. This modification has certain advantages over the embodiment in which the thermostat ST is disposed in a secondary reactor winding. The contacts 223 and 225 of the thermostat ST are connected in series with the coil 221 which is connected across the primary P2. Thus the thermostat which has the line voltage (usually 230 volts) in it is nested in the primary P2 which has the same voltage in it. The thermostat ST is also thus located in the primary side of the major insulation 401 (usually a phenolic condensation product) thus minimizing the probability of insulation failure between the primary electrical parts and the secondary electrical parts. This is important for safety means because the operator is connected to the secondary parts when he is holding the welding electrode. My invention, therefore, is not to be limited except insofar as is necessitated by the spirit of the prior art.

I claim as my invention:

1. An arc welder comprising a transformer having a primary and a secondary, rectifier means connected to said secondary, means for connecting said rectifier means to a welding electrode and work and circuit interrupting means connected to said primary to interrupt the power flow to said primary, said rectifier means and transformer being of the type in which in the event of abnormal conditions requiring operation of said interrupting means the temperature of said rectifier means tends to level off before it reaches a dangerous condition while the temperature of said transformer rises at a substantially higher rate than the temperature of said rectifier means, said arc welder being characterized by thermally actuable means embedded in said transformer in intimate thermal contact with a winding thereof and connected to said circuit interrupting means for actuating said interrupting means when the temperature of said welder becomes excessive.

2. In combination, a transformer for connection to a commercial power supply having a primary and a secondary, circuit interrupting means connected to said primary for interrupting the power flow to said primary, dry rectifier means connected to said secondary for supplying direct-current power and thermally actuable means connected to said circuit interrupting means and embedded in said transformer in intimate thermal contact with turns of one of the windings of said transformer, said rectifier means and transformer being of the type in which in the event of abnormal conditions requiring the operation of said interrupting means, the temperature of said rectifier means tends to level off before it reaches a dangerous condition while the temperature of the transformer rises at a substantially higher rate than the temperature of said rectifier means.

3. In combination, a transformer for connection to a commercial power supply having a primary and a secondary, circuit interrupting means connected to said primary for interrupting the power flow to said primary, dry rectifier means connected to said secondary for supplying direct-current power and thermally actuable means connected to said circuit interrupting means and embedded in said secondary in intimate thermal contact with a turn of said secondary, said rectifier means and transformer being of the type in which in the event of abnormal conditions requiring the operation of said interrupting means, the temperature of said rectifier means tends to level off before it reaches a dangerous condition while the temperature of said secondary rises at a substantially higher rate than the temperature of said rectifier means.

4. An arc welder comprising a transformer having a primary and a secondary, rectifier means connected to said secondary, means for connecting said rectifier means to a welding electrode and work and circuit interrupting means connected to said primary to interrupt the power flow to said primary, said rectifier means and transformer being of the type in which in the event of abnormal conditions requiring operation of said interrupting means the temperature of said rectifier means tends to level off before it reaches a dangerous condition while the temperature of said secondary tends to rise at a substantially higher rate than the temperature of said rectifier means, said arc welder being characterized by thermally actuable means embedded in said secondary of said transformer in intimate thermal contact with a turn of said secondary, said thermally actuable means being connected to said circuit interrupting means for actuating said interrupting means when the temperature of said welder becomes excessive.

5. An arc welder comprising a transformer having a primary and a secondary, rectifier means connected to said secondary, means for connecting said rectifier means to a welding electrode and work and circuit interrupting means connected to said primary to interrupt the power flow to said primary, said rectifier means and transformer being of the type in which in the event of abnormal conditions requiring operation of said interrupting means the temperature of said rectifier means tends to level off before it reaches a dangerous condition, said secondary rising in temperature at a higher rate than the other windings of said transformer and at a substantially higher rate than that of said rectifier means in the event of said abnormal conditions, said arc welder being characterized by thermally actuable means embedded in said secondary of said transformer in intimate thermal contact with a turn of said secondary, said thermally actuable means being connected to said circuit interrupting means for actuating said interrupting means when the temperature of said welder becomes excessive.

6. In combination, a transformer of the polyphase type for connection to a commercial power supply having a primary and a secondary-reactance including variable reactance means, means connecting said secondary-reactance in a polygonal circuit so that the energy absorbed by said reactance means circulates, and is absorbed by said circuit, circuit interrupting means connected to said primary for interrupting the power flow to said primary, dry rectifier means connected to said secondary-reactance for supplying direct-current power and thermally actuable means connected to said circuit interrupting means and embedded in said secondary reactance in intimate thermal contact with a turn of said secondary reactance, said rectifier means and transformer being of the type in which in the event of abnormal conditions requiring the operation of said interrupting means the temperature of said rectifier means tends to level off before it reaches a dangerous condition and the temperature of said secondary tends to rise at a substantially higher rate than the temperature of said rectifier means.

7. In combination, a polyphase transformer having a primary and a polyphase secondary connected in a polygonal network, electrically actuable cooling means connected to said transformer for cooling said transformer, a circuit interrupter connected to said primary to interrupt the current flow to said primary and to said cooling means, said interrupter having a normally open trip circuit which is closed to actuate said interrupter to interrupt, rectifier means connected to said secondary, said rectifier means and transformer being of the type in which the event of abnormal conditions requiring operation of said interrupting means, the temperature of said rectifier means tends to level off before it reaches a dangerous condition while the temperature of said secondary tends to rise at a substantially higher rate than the temperature of said rectifier means, a thermally actuable element embedded in said secondary in intimate thermal contact only with one winding of said secondary, connections between said element and said trip circuit for closing said trip circuit when the temperature of said one winding becomes excessive, and switch means in said trip circuit for opening said trip circuit independently of said thermally actuable element.

8. An arc welder comprising a transformer having a primary and a secondary, rectifier means connected to said secondary, means for connecting said rectifier means to a welding electrode and work and circuit interrupting means connected to said primary to interrupt the power flow to said primary, said arc welder being characterized by thermally actuable means embedded in the primary of said transformer in intimate thermal contact with a winding thereof and connected to said circuit interrupting means for actuating said interrupting means when the temperature of said welder becomes excessive, said transformer and rectifier being of the type in which in the event of abnormal conditions requiring operation of said interrupting means, the temperature of said rectifier means tends to level off before it reaches a dangerous condition while the temperature of said primary tends to rise at a substantially higher rate than the temperature of said rectifier means.

9. An arc welder comprising a transformer of the polyphase type having a plurality of phase windings having a primary and a secondary, rectifier means connected to said secondary, means for connecting said rectifier means to a welding electrode and work and circuit interrupting means connected to said primary to interrupt the power flow to said primary, said arc welder being characterized by thermally actuable means embedded in said transformer in intimate thermal contact with one of said phase windings, and circuit means including said thermally actuable means connected to said circuit interrupting means and also connected across said one phase winding to derive power from the potential across said phase winding for actuating said interrupting means when the temperature of said welder becomes excessive, said transformer and rectifier means being of the type in which in the event of abnormal conditions requiring operation of said interrupting means, the temperature of said rectifier means tends to level off before it reaches a dangerous condition while the temperature of said phase windings tends to rise at a substantially higher rate than the temperature of said rectifier means.

10. An arc welder comprising a transformer having a primary and a secondary, electrically actuable cooling means connected to said transformer for cooling said transformer, rectifier means connected to said secondary, means for connecting said rectifier means to a welding electrode and work and circuit interrupting means connected to said primary and to said cooling means to interrupt the power flow to said primary and to said cooling means, said rectifier means and transformer being of the type in which in the event of abnormal conditions requiring operation of said interrupting means, the temperature of said rectifier means tends to level off before it reaches a dangerous condition while the temperature of said transformer rises at a substantially higher rate than the temperature of said rectifier means, said arc welder being characterized by thermally actuable means embedded in said transformer in intimate thermal contact with a winding thereof and connected to said circuit interrupting means for actuating said interrupting means when the temperature of said welder becomes excessive and manually actuable means connected to said circuit interrupting means when actuated conditioning said interrupting means to permit power flow to said transformer independently of said thermally actuable means.

References Cited in the file of this patent

UNITED STATES PATENTS

| | | |
|---|---|---|
| 1,959,513 | Weyandt | May 22, 1934 |
| 2,112,093 | Harty | Mar. 22, 1938 |
| 2,125,110 | Harty | July 26, 1938 |
| 2,471,840 | Seely | May 31, 1949 |
| 2,518,597 | Brooks | Aug. 15, 1950 |
| 2,523,117 | Jennings | Sept. 19, 1950 |

FOREIGN PATENTS

| | | |
|---|---|---|
| 156,266 | Germany | Jan. 15, 1939 |